United States Patent [19]

Morton et al.

[11] 4,401,926
[45] Aug. 30, 1983

[54] PULSE CONTROLLERS

[75] Inventors: John Morton; Keith D. Stevens, both of Stockport, England

[73] Assignee: Cabeform Limited, Cheshire, England

[21] Appl. No.: 877,526

[22] Filed: Feb. 13, 1978

[30] Foreign Application Priority Data

| | | |
|---|---|---|
| Feb. 11, 1977 [GB] | United Kingdom | 5853/77 |
| Mar. 17, 1977 [GB] | United Kingdom | 11459/77 |
| Dec. 30, 1977 [GB] | United Kingdom | 54383/77 |
| Dec. 30, 1977 [GB] | United Kingdom | 54384/77 |

[51] Int. Cl.³ .......................................... H02P 3/14
[52] U.S. Cl. .................................... 318/376; 318/139
[58] Field of Search ............... 318/367, 371, 375, 376, 318/273, 274, 381, 139, 341, 332

[56] References Cited

U.S. PATENT DOCUMENTS

| | | | |
|---|---|---|---|
| 3,593,089 | 7/1971 | Appelo | 318/376 |
| 3,624,475 | 11/1971 | Smith | 318/341 |
| 3,630,304 | 12/1971 | Sahinkaya | 318/376 |
| 3,735,220 | 5/1973 | Renner | 318/341 |
| 3,803,472 | 4/1974 | Konrad | 318/341 |
| 3,808,481 | 4/1974 | Rippel | 318/139 |
| 3,989,990 | 11/1976 | Thompson | 318/139 |
| 4,037,145 | 7/1977 | Bailey et al. | 318/341 |
| 4,074,175 | 2/1978 | Born et al. | 318/332 |
| 4,084,119 | 4/1978 | Kato | 318/341 |
| 4,124,812 | 11/1978 | Naito et al. | 318/376 |

*Primary Examiner*—David Smith, Jr.
*Assistant Examiner*—M. K. Mutter
*Attorney, Agent, or Firm*—Sughrue, Mion, Zinn, Macpeak & Seas

[57] ABSTRACT

A pulse controller for controlling the energization and regenerative braking of a DC electric motor. An electronic switch connects the motor to a power source during motor driving and controls motor current during regenerative braking, the switch being rendered alternately conductive and non-conductive during both driving and braking and the ratio of conductive to non-conductive periods being controlled. The conductive and non-conductive periods are interrelated such that, regardless of the ratio between the periods, during regenerative braking the switch alternates between its conductive and non-conductive states at a rate sufficient to automatically maintain the generated motor current within desired maximum and minimum limits.

15 Claims, 8 Drawing Figures

PULSE CONTROLLERS

The present invention relates to pulse controllers for D.C. electric motors, and in particular to pulse controllers which provide for the regenerative braking of D.C. motors.

Pulse controllers for D.C. motors are now widely used because of their low power losses and smooth operating characteristics when compared with resistor/contactor controllers. Increasing interest is now being shown in ways of providing for the regenerative braking of D.C. motors, particularly with a view to increasing the range of battery-powered electric vehicles to which D.C. motors are especially suited.

The D.C. motor regenerative braking systems so far proposed have been found to be unsatisfactory in use because the regenerative braking is not sufficiently smooth and/or the systems are suitable only for particular motors to which their characteristics are tailored. For example, one of the applicants own prior controllers required the careful execution of an extensive list of installation instructions if reliability was to be achieved, contrasting with the simple installation procedures required for fitting a controller not having a regenerative braking capability.

Known pulse controllers comprise an electronic switch such as a thyristor which controls the connection of the motor to a power source such as a battery. During normal motor driving the electronic switch is turned on and off cyclically, the ratio of the 'on' to 'off' periods (the mark/space ratio) being controlled to adjust the mean power supplied to the motor. In known regenerative braking systems, the electronic switch is used to control the regeneration of the power source by the motor acting as a generator, the motor connections to the battery being such that during regenerative braking current is driven by the motor through the battery. The electronic switch is turned on and off cyclically during regenerative braking to prevent the motor current falling too low or rising too high. The minimum current must be limited to avoid the regenerative braking system becoming inoperative due to inadequate voltage generation, and the maximum current must be limited to avoid damage to the system and excessively fierce braking.

Previously proposed regenerative braking systems have required circuits for setting predetermined maximum and minimum current limits and for controlling the electronic switch to maintain the current within these limits. Whereas maximum current limiting circuitry is normally provided for system protection during normal motor driving and is available for use during regenerative braking, additional circuitry has been required heretofore to limit the minimum current. Furthermore, it has been found necessary to carefully tailor the additional circuitry to match the characteristic of the motor to which it is fitted.

It is an object of the present invention to obviate or mitigate the above problems.

Pulse control systems at present in use can be divided into three classes in terms of their operation during normal motor driving. All three classes of systems operate to connect the motor to the power source for a time $t_1$ and disconnect the motor from the power source for a time $t_2$, but class 1 systems keep $t_1$ constant and vary $t_2$ (variable frequency control), class 2 systems keep $(t_1+t_2)$ constant and vary $t_1$ and $t_2$ (constant frequency variable pulse width control), and class 3 systems vary both the frequency and the pulse width.

It has now been discovered that by adopting a class 3 system both normal driving and regenerative braking can be controlled by the same circuitry, thereby avoiding the complexity and expense inherent in the prior art system.

According to the present invention, there is provided a pulse controller for controlling the energisation and regenerative braking of a D.C. electric motor, comprising an electronic switch for connecting the motor to a power source during motor driving and for controlling motor current during regenerative braking, means for rendering the electric switch alternately conductive and non-conductive, and means for controlling the ratio of conductive to non-conductive periods to control the motor current during regenerative braking, wherein the conductive and non-conductive periods are interrelated such that, regardless of the ratio between the periods, the switch alternates between its conductive and non-conductive states at a rate sufficient to automatically maintain the motor current within desired maximum and mininum limits.

Preferably the conductive and non-conductive periods are so interrelated as to maintain motor current ripple substantially constant for all torques and speeds required. Preferably the electronic switch is controlled by pulses having a mark/space ratio such that $t_1 t_2/t_1+t_2$ is a constant, the switch being turned on at time zero, off at time $t_1$, and an again at time $t_1+t_2$.

Thus, in contrast to previous systems in which upper and lower current limits are set during regenerative braking by means additional to the means for rendering the electronic switch conductive and non-conductive during motor driving, in accordance with the present invention no such additional means are required. Significant circuit simplifications result.

The present invention also provides a method for controlling the regenerative braking of a D.C. electric motor, wherein an electronic switch arranged to control regenerative braking current is rendered alternately conductive and non-conductive, the conductive and non-conductive periods being interrelated such that the switch alternates between its conductive and non-conductive states at a rate sufficient to automatically maintain the motor current within desired maximum and minimum limits.

According to a further aspect of the present invention, there is provided a pulse controller for controlling the energisation and regenerative braking of a D.C. electric motor, comprising an electronic switch, means for connecting the motor across a D.C. power source in either a first motor driving configuration or a second source regenerating configuration, and a pulse generator for providing a train of pulses to control the electronic switch, the mark/space ratio of the pulse train being controllable between maximum and minimum values to determine the duty cycle of the switch, and the maximum and minimum regenerative braking currents being determined by the periods for which the pulse train maintains the switch conducting and non-conducting, which periods are determined solely by a predetermined interrelationship between the marks and spaces of the pulse train.

In regenerative braking systems, it is known that the voltage generated during regenerative braking must be prevented from exceeding the power source voltage to avoid a runaway condition being established. This condition results as a "plugging" diode normally provided across the motor armature is rendered conductive when the power source voltage is exceeded by the generated armature voltage. Current is then driven through the diode, but some current passes via the motor field thereby increasing the generated voltage. An unstable condition in which the generated voltage increases out of control is thus established.

In order to avoid the above problem it has been proposed to sense the generated voltage and limit the regenerative braking current whenever the sensed voltage reaches a predetermined upper limit. This is satisfactory so long as the power source voltage is maintained substantially constant as the limit can be set just below the constant supply voltage, but where the power supply is a battery on for example a fork lift truck, the battery voltage may fall by up to 50% for example before the controller cuts out. The predetermined limit has to take account of this "worst case" possibility and accordingly much of the potential benefit of regenerative braking is lost particularly when braking at a low speed when the limit is reached very quickly.

In accordance with the present invention, means may be provided for comparing the voltage supplied by the power source with the generated armature voltage during regenerative braking and means for controlling the regenerative braking current to maintain the generated voltage below the power source voltage.

Preferably the voltage across the plugging diode is sensed and the regenerative braking current is controlled to prevent the sensed voltage from falling below a predetermined level.

As is well known, a fully charged battery power source can be damaged if a "regenerative" current is driven through it. To prevent this happening, the present invention also provides means for sensing battery voltage, and means for preventing regenerative braking if the sensed battery voltage indicates that the battery is fully charged.

When an electric motor is regeneratively braked under the control of a pulse controller, the motor speed falls and eventually the electronic switch remains fully conductive. When this happens the motor is either stopped or moving only very slowly, and in conventional systems it has been necessary for the controller operator to wait for the motor to stop and then to switch the controller to its normal drive condition before continuing with normal driving.

In accordance with the present invention, means are provided for monitoring the duration of periods in which the electronic switch remains conductive during regenerative braking, and means are provided to automatically switch the controller into its normal driving condition when the duration of one of said periods exceeds a predetermined limit.

The monitoring means may comprise a timing circuit which is "set" and "reset" by the leading and trailing edges respectively of "mark" pulses applied to the electronic switch by a pulse generator.

Preferably the controller is operated in response to the actuation of a single lever which operates forward and reverse contacts and also switches the controller to its regenerative braking condition when moved through a neutral position to reverse the contacts. At the end of regenerative braking, or after a delay which indicates that regenerative braking has not occurred, the controller is automatically switched to its normal driving condition and the motor is driven in the opposite direction to that in which it was originally moving.

In a regenerative braking system, when an attempt is made to achieve regenerative braking by switching to a regenerative braking mode, the motor current must rise to a minimum current before regenerative braking can occur. The current can only rise during periods when the electronic switch is conductive and therefore, if the switch is being turned on and off alternately from the moment the controller is switched to the regenerative braking mode, the start of regenerative braking is delayed and energy is lost in the current building period. Indeed if the motor speed is low the necessary motor current for regenerative braking may never be achieved and a net energy loss may result from switching to the regenerative braking mode.

Accordingly the present invention provides means for maintaining the electronic switch in its conductive state for a period subsequent to the switching of the controller to the regenerative braking mode whereby current generated by the D.C. motor builds up continuously until sufficient to provide regenerative braking.

Embodiments of the present invention will now be described, by way of example, with reference to the accompanying drawings, in which.

Figure 1:
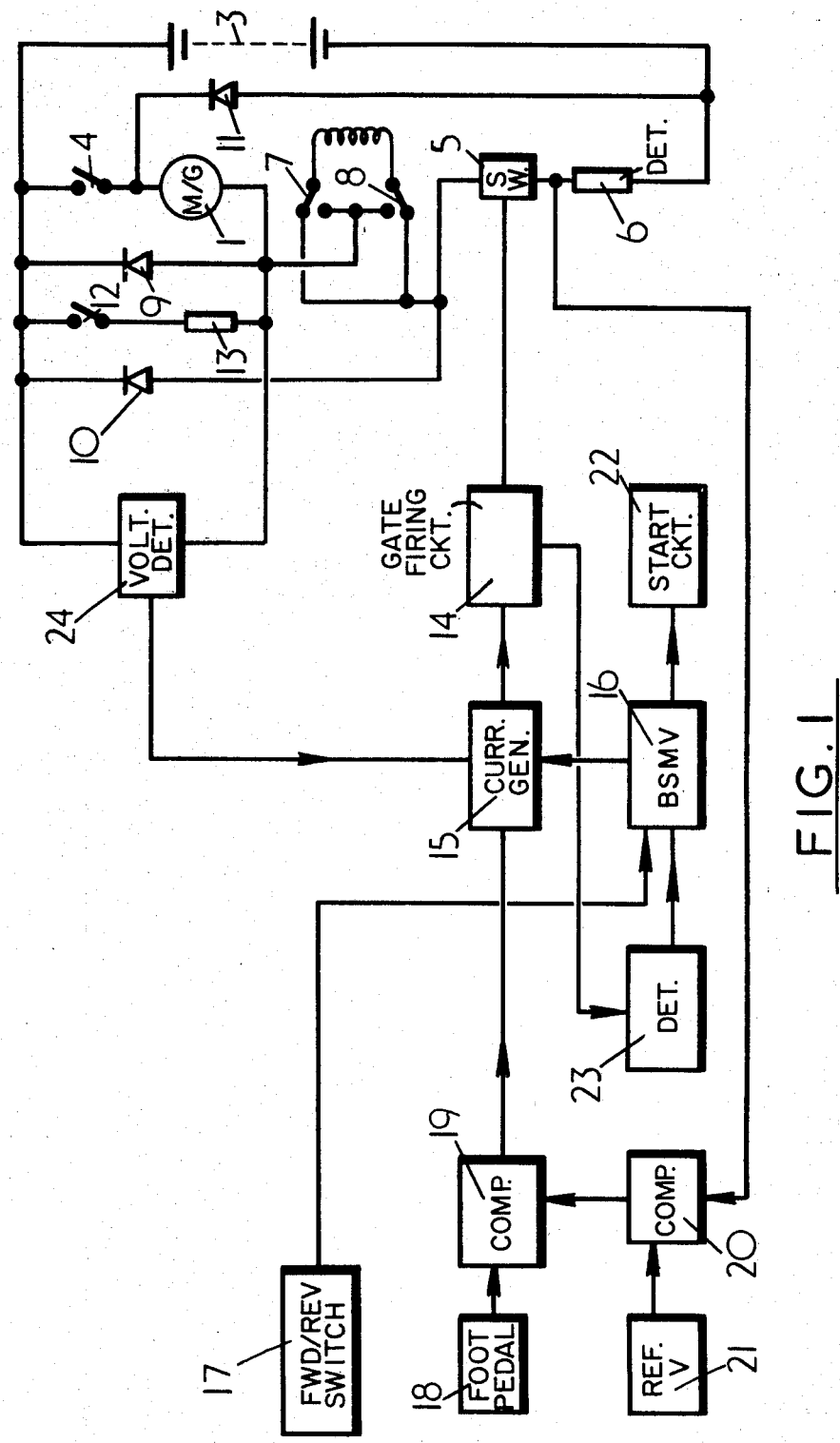
FIG. 1 is a schematic diagram of a pulse controller arranged to control a D.C. series traction motor.
Figure 6:
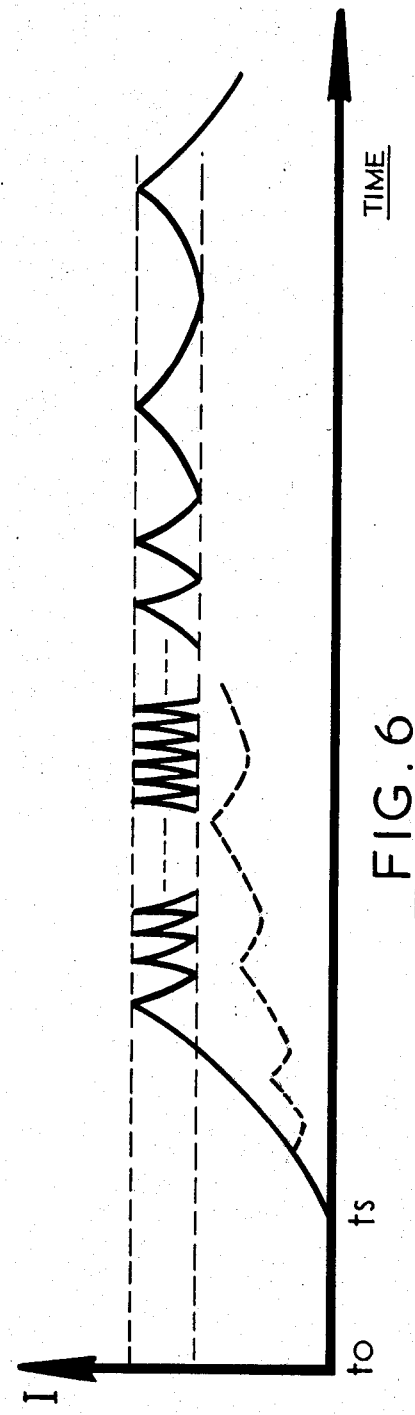
Figure 3:
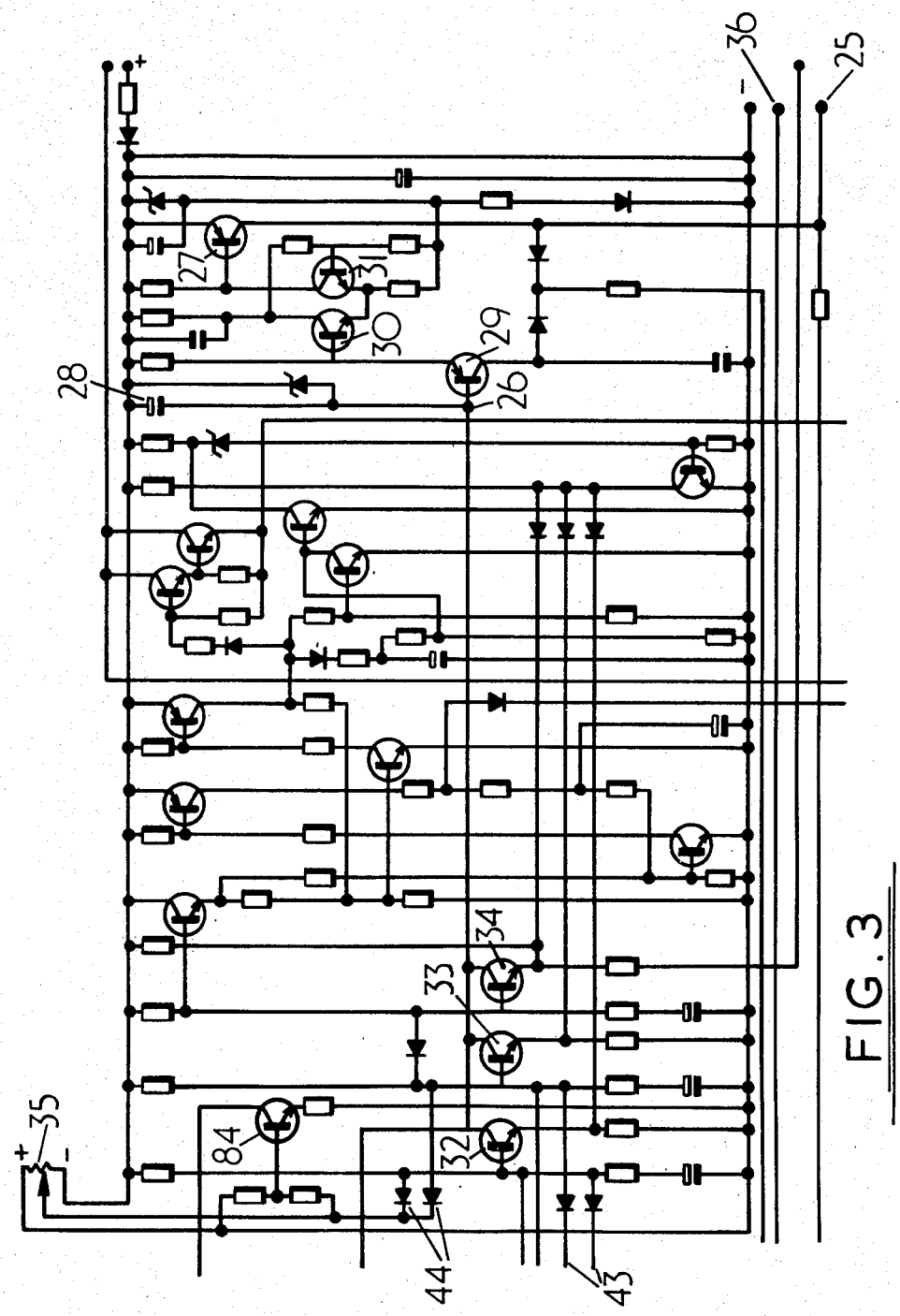
Figure 4:
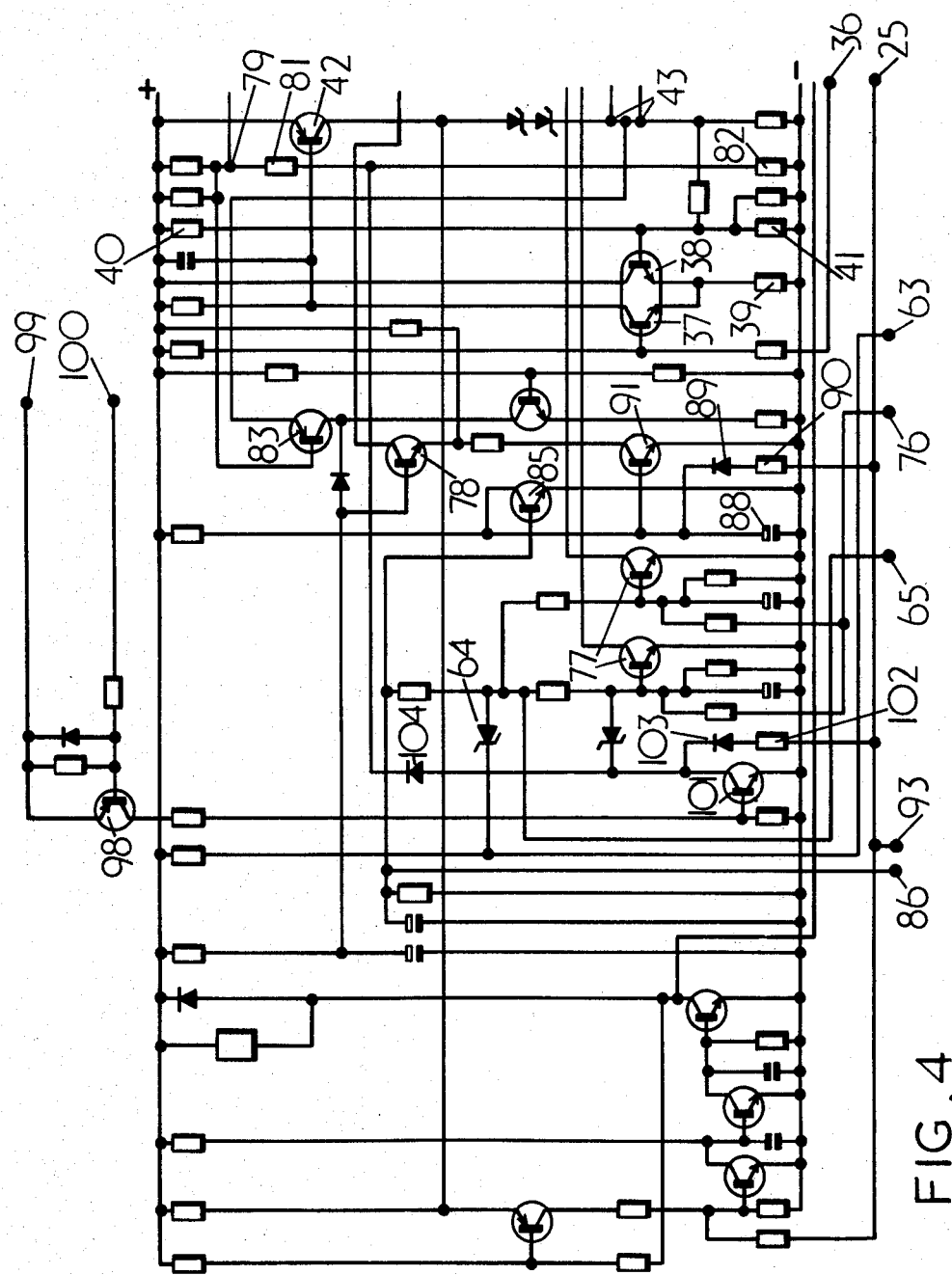
Figure 5:
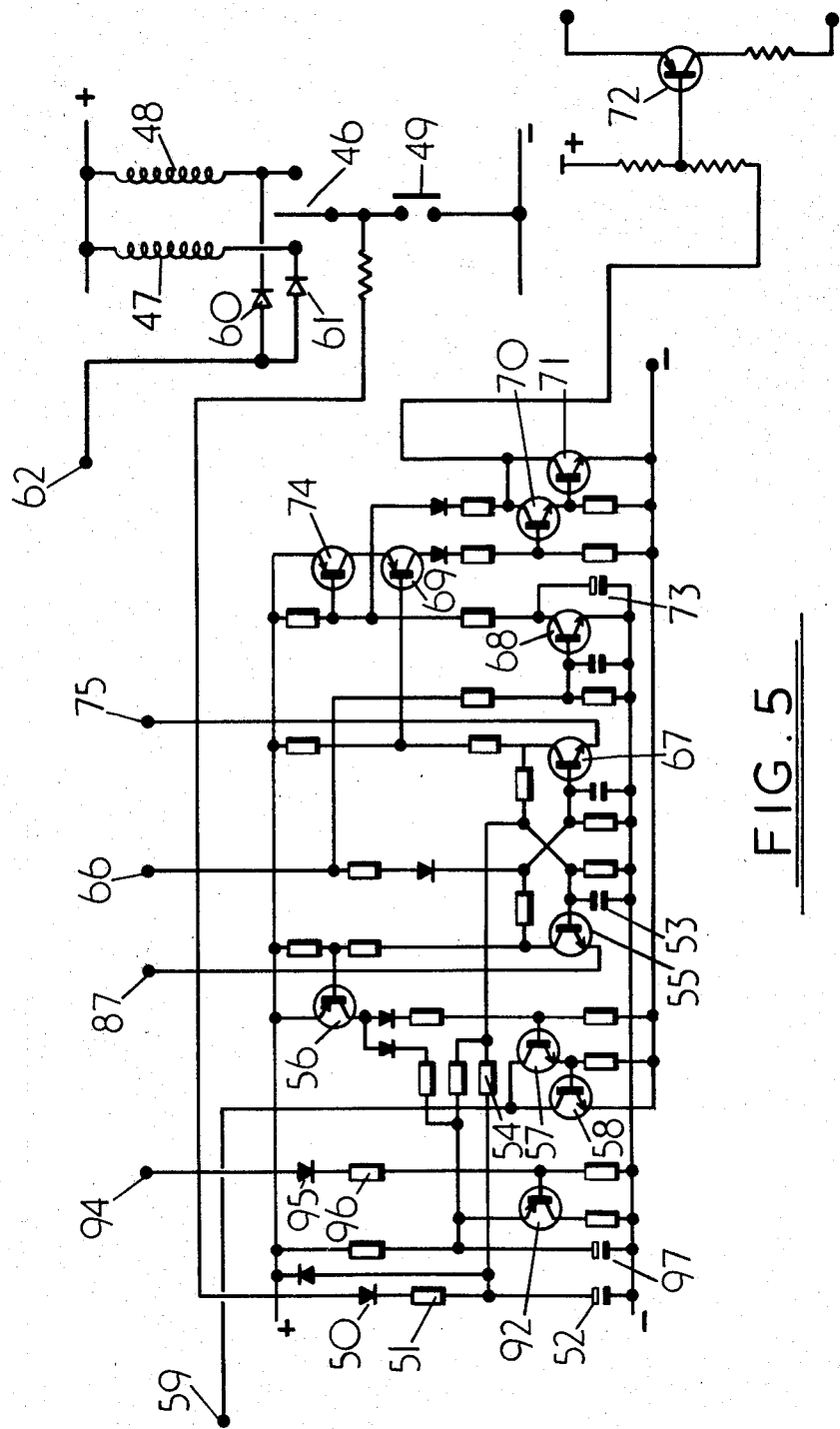

FIGS. 3, 4 and 5 together illustrate in detail control circuits schematically illustrated in FIG. 1;

FIG. 6 illustrates motor current waveforms during regenerative braking; and

Figure 8:
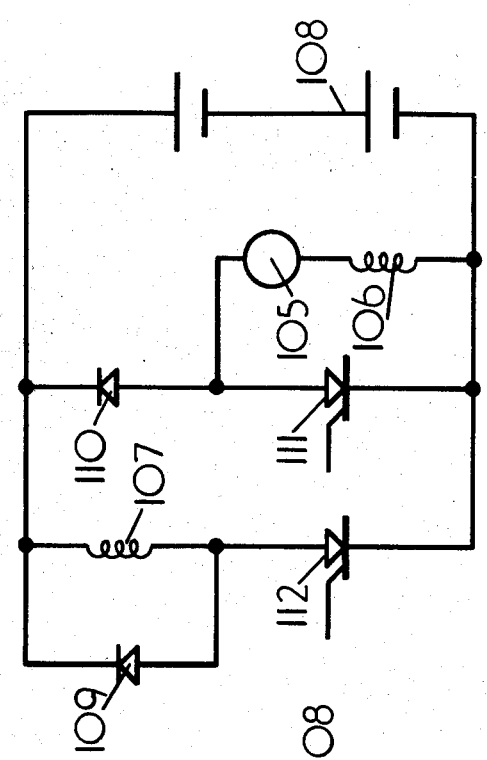
Figure 7:
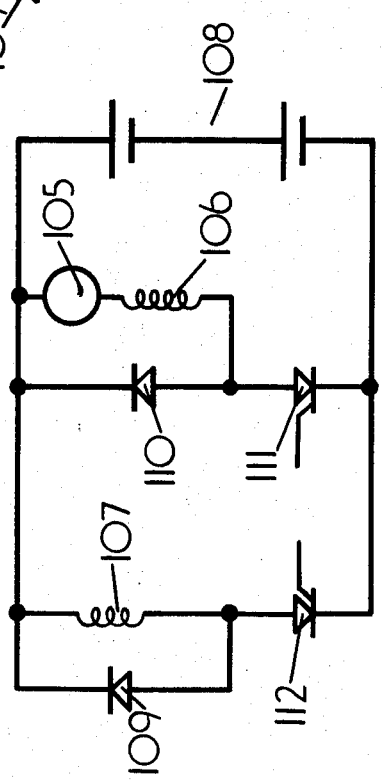

FIGS. 7 and 8 illustrate the application of the present invention to a compound motor.

Referring to FIG. 1, a DC series motor comprising an armature 1 and field winding 2 is shown connected across a battery 3 in series with line contacts 4, an electronic switch 5 and a current detector 6. Forward and reverse contacts 7, 8 control the connection of the field 2 in series with the armature 1.

The electronic switch 5 may comprise thyristors arranged in any convenient manner. Such switches are well known and are arranged to be turned on and off cyclically to control the motor current. A plugging diode 9 is connected across the armature and a flywheel diode 10 is connected across the armature and field. The circuitry described above enables the motor to be driven in either direction.

A further diode 11 is provided to enable the regenerative braking of the motor. If the motor is rotating, the contacts 4 are opened, and the switch 5 is closed, the motor acts as a generator and current builds up in the path defined by armature 1, field 2, switch 5, detector 6 and diode 11. Once the armature voltage exceeds the battery supply voltage, the switch 5 may be opened and current is then driven through the battery 3 via diodes 10 and 11. Regenerative braking is thus achieved and by careful control of the switch 5 pulses of current can be passed through the battery so long as the armature voltage can be maintained above the supply voltage.

If regenerative braking is to start, it is necessary for the field current is such that a sufficiently high voltage is generated to render the diode 11 and switch 5 conductive. Once this has occurred the motor will be self exciting. To ensure that regenerative braking can start a switch 12 is provided in series with a resistor 13, means described hereafter being provided to close the switch 12 for a period sufficient to initiate self excitation.

The switch 5 is controlled by pulses supplied by a switch gate firing circuit 14. The pulses have a mark/space ratio proportional to a current signal supplied by a current generator circuit 15. A bistable circuit 16 switches the current generator to provide either a normal drive current signal or a regenerative braking current signal as will be described hereinafter.

When it is desired to drive the motor, an operator selects forward or reverse with a switch 17 that controls contacts 7, 8 and depresses a foot pedal 18 which provides a current demand signal to a comparator 19. A further comparator 20 passes a reference signal to comparator 19 from a reference source 21 unless an input to the comparator 20 derived from the detector 6 is greater in magnitude than the reference signal. In the latter case the input from detector 6 is applied to comparator 19. The comparator 19 passes the greater of its two inputs to the current generator circuit 15 which in turn passes a current inversely proportional to its input to the gate firing circuit 14. The greater the magnitude of the input to current generator 15, the lower is the mark space ratio of the pulses provided by the gate firing circuit.

It will be appreciated from the above that the reference signal sets a maximum mark/space ratio and the signal from detector 6 reduces this maximum proportionately when the current through detector 6 exceeds the predetermined limit set by the reference signal.

When it is desired to regeneratively brake the motor, the switch 17 is reversed and the foot pedal 18 is depressed. This reverses contacts 7, 8, opens contacts 4 and switches bistable 16. The bistable 16 then switches the current generator 15 to its regenerative braking mode, and energises a starting circuit 22 which causes the switch 12 to open. The current generator circuit is arranged to turn on the switch 5 for a period subsequent to selection of the regenerative braking mode. This ensures that the motor current builds up continuously at a rate only dependent upon motor speed and, provided the motor speed is high enough, prevents the switch 5 being turned off until a current level sufficient for regenerative braking has been reached.

Assuming that a regenerative braking condition is achieved, the motor will slow down as pulses of current are forced through the battery. Eventually the motor speed will be so low that the generated voltage is not sufficient to drive current through the battery. The switch 5 will then be held on continuously. This condition is detected by a circuit 23 which automatically switches the bistable 16 to its normal drive condition after the switch 5 has been on continuously for a predetermined period.

During regenerative braking the switch 4 is open. If the voltage generated across the armature 1 exceeds the battery voltage, diode 9 is forward biased. A high current is then driven through diode 9, and a low but not insignificant current is driven through the field 2. This field current increases the generated voltage, thereby increasing the field current further, and an unstable condition is thus established.

To prevent this happening, an overvoltage detector circuit 24 compares the battery voltage with the generated voltage by sensing the voltage across diode 9. The circuit 24 provides an input to the current generator 15 whenever the voltage across diode 9 falls below a predetermined limit such as 10 volts for example. This input is effective to lower the maximum braking current limit so as to reduce the maximum generated voltage.

During regenerative braking, the motor current must be prevented from exceeding an upper limit to prevent damage to the electrical system and to prevent excessively fierce braking. The motor current must also be prevented from falling below a lower limit to prevent the regenerative braking system becoming inoperative due to inadequate voltage generation. The motor current can be maintained within these limits by careful control of the mark/space ratio and frequency of the pulses applied to the switch 5.

Figure 2:
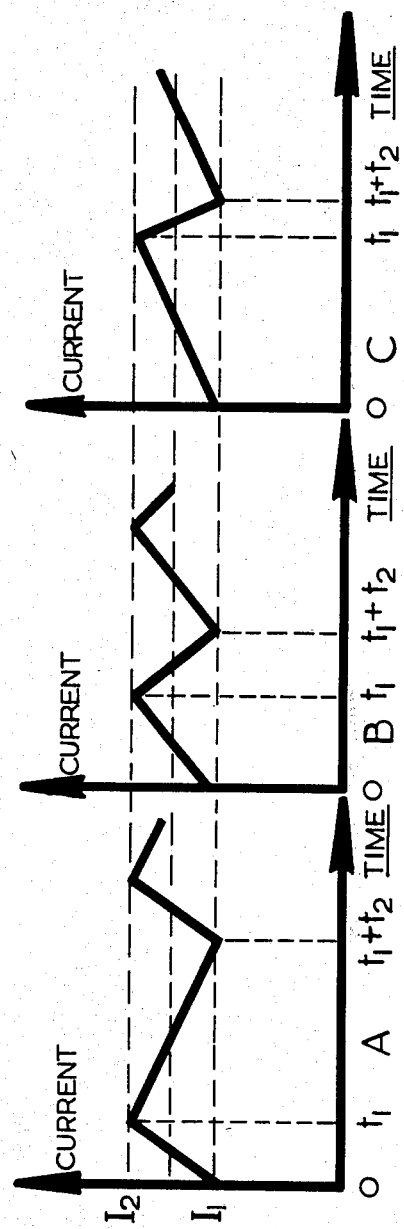
FIGS. 2A, 2B and 2C illustrate motor current waveforms during normal driving of the motor of FIG. 1.

Referring to FIG. 2, three similar curves are shown to illustrate the manner in which the motor current is controlled. The curves show the variation of current with time for three different mark/space ratios but the same mean motor current. The mark/space ratio increases from FIG. 2A to FIG. 2B to FIG. 2C. In each case the switch 5 (FIG. 1) is turned on at time 0, turned off at time t1, and turned on again at time t1+t2. It will be noted that the frequency of the illustrated waveforms is greatest for the intermediate mark/space ratio (FIG. 2B).

The waveforms shown have a constant ripple and may be obtained by controlling the pulse train applied to the switch so that t1 t2/(t1+t2) is a constant. FIG. 2 serves merely to illustrate waveform variations generally and is therefore not to scale. A constant ripple waveform has been used in the past to avoid circuit malfunctions which can arise if large ripple variations are allowed to occur.

When an operator actuates the accelerator foot pedal 18, the mark/space ratio increases from a predetermined minimum value in accordance with the above formula and the motor current rises. The output of the pedal 18 is passed directly to the current generator 15 unless it is modified by the output of the comparator 20.

Referring now to FIGS. 3, 4 and 5, the drive and regenerative braking control circuit schematically illustrated in FIG. 1 will be described in detail. The left hand side of FIG. 3 connects with FIG. 4, and the bottom side of FIG. 4 connects with FIG. 5.

Referring initially to FIG. 3, terminals 25 and 26 correspond to the output and input respectively of the gate firing circuit 14 of FIG. 1. The signal on terminal 25 is controlled by the conduction of transistor 27. A current proportional to the desired mark/space ratio is drawn continuously from terminal 26 and a capacitor 28 charges at a rate proportional to the current drawn. When the capacitor 28 has charged up to a predetermined voltage, transistor 29 turns off a transistor 30. Transistor 31 then turns on, turning on transistor 27 also. When transistor 27 is on, the collector circuit of transistor 29 is disabled and the capacitor 28 discharges through the base-emitter junction of transistor 29. The greater the current being drawn from terminal 26, the slower is the rate of discharge. Thus, as the length of the "mark" period increases, the length of the "space" period decreases. The desired mark/space ratio in which t1 t2/(t1+t2) is constant is achieved.

The collectors of three transistors 32, 33 and 34 are connected to terminal 26 and these three transistors control the current drawn from terminal 26 except during regenerative braking. Transistor 32 provides control during non-regenerative braking, transistor 33 controls slow speed drive, and transistor 34 controls high speed drive. The current drawn is dependent upon the position of the wiper of a potentiometer 35 controlled by the foot pedal.

The motor current detector 6 of FIG. 1 provides a signal at input 36. This signal is applied to the base of a transistor 37 of a balanced pair of transistors 37, 38 (FIG. 4). The transistors 37, 38 are mounted together so that their characteristics are maintained the same even when they are subjected to temperature changes. The emitters of the balanced pair are joined and connected to the negative line by a resistor 39.

Tha bias on the transistors 37, 38 is such that transistor 37 conducts when no current passes through the detector 6 (FIG. 1), that is when the switch 5 is off. When current does pass through detector 6, the voltage appearing at the base of transistor 37 changes and if the current is sufficiently large transistor 37 turns off. The current required to turn transistor 20 is dependent upon the voltage provided by resistors 40, 41 to the base of transistor 38 as the greater the forward bias on the base/emitter junction of transistor 38 the more positive is the voltage applied to the emitter of transistor 37. The voltage applied to the base of transistor 38 thus corresponds to the reference signal provided by source 21 (FIG. 1).

When the transistor 37 begins to turn off, the voltage at its collector rises, and this collector voltage is applied to transistor 42 which begins to conduct. A detector current related signal thus appears at terminals 43.

The demand signal provided by the pedal potentiometer 35 (FIG. 3) is normally applied by dioded 44 to the base terminals of the drive control transistors. If however the pedal setting is such that the demand signal is more positive than the detector current signal at terminals 43, diodes 45 turn on and diodes 44 turn off. The demand signal is thus modified.

The circuitry located between transistors 29 and 34 in FIG. 3 is a conventional field weakening circuit which enables the motor characteristic to be modified to give a higher top speed. This circuit is well known and will therefore not be described in detail.

Referring now to FIG. 5, a forward/reverse switch 46 is shown which corresponds to switch 17 of FIG. 1. The switch 46 may be moved to either energise coil 47 to move contacts 7 and obtain forward drive or a coil 48 to move contacts 8 and obtain reverse drive. An on/off switch 49 actuated by foot pedal 18 of FIG. 1 has to be closed before driving can commence.

When starting from rest, the driver selects forward or reverse as desired with switch 46. Current then flows via coil 47 or 48 diode 50 and resistor 51 to charge a capacitor 52. A capacitor 53 is also charged via resistor 54. Transistor 55 is thus turned on and in turn the transistor chain 56, 57 and 58 is turned on. Current is then drawn via terminal 59 to energise a coil (not shown) which closes contacts 4 (FIG. 1). Driving can then commence.

When the motor is running and it is desired to obtain regenerative braking, the switch 46 is reversed while the foot pedal is held down. Diodes 60, 61, one of which is conductive when switches 49 and 46 are both closed, are momentarily released as the switch 46 passes through a central position. Current flows via terminal 62 (FIG. 5), terminal 63 (FIG. 4), Zener diode 64, terminal 65 and terminal 66 (FIG. 5) to turn on transistor 67 and turn off transistor 57. Transistors 57, 67 thus act as a bistable multivibrator and correspond to the circuit 16 of FIG. 1.

When transistor 57 turns off, the line contactor coil (not shown) connected to terminal 59 is deenergised and switch 4 (FIG. 1) opens. When transistor 67 turns on, a transistor 68 turns off and starting circuit transistor chain 69, 70 and 71 turns on. Current is then drawn through a potential divider in the base circuit of a heavy duty transistor 72. The transistor 72 corresponds to the switch 12 of FIG. 1 and thus once transistor 71 is turned on braking current can build up in the motor. The transistor 71 is turned off after a predetermined period such as 200 ms as the result of a capacitor 73 charging up sufficiently to turn off a transistor 74 and thereby turn off transistor chain 69, 70 and 71. By the time transistor 71 is turned off, the motor will be self exciting.

With transistor 67 on, current passes via terminal 75 (FIG. 5) to terminal 76 (FIG. 4) to turn on the pair of transistors 77 and thereby to turn off the normal drive control transistors 32, 33 and 34 (FIG. 3). During regenerative braking, the current signal at terminal 26 (FIG. 3) is provided by transistor 78 (FIG. 4). The braking current demand signal appears at terminal 79 and this signal is initially determined by a potential divider formed by resistor 80, 81 and 82. The signal is compared in transistor 83 with the current signal at terminal 43 which is dependent upon the current through detector 6 (FIG. 1). If the foot pedal is depressed then the signal appearing on the wiper of potentiometer 35 draws current through transistor 84 (FIG. 3). This pulls the demand signal at terminal 79 more negative, i.e. increases current demand.

At the start of regenerative braking, if the gate firing circuit is operative immediately so as to supply the selected mark/space ratio to the switch 5, the build up of current is delayed. To avoid this happening, a transistor 85 (FIG. 4) is arranged to be turned off by a signal provided at terminal 86 from transistor 55 (FIG. 5) via terminal 87. The transistor 85 turns off as soon as the forward/reverse switch 46 is turned off and a capacitor 88 charges. A diode 89 and resistor 90 couple the capacitor voltage to the terminal 25 such that the switch 5 (FIG. 1) is held on for a period of up to about 100 ms as determined by the charging rate of capacitor 88. After this predetermined period the charge across capacitor 88 is such as to turn on transistor 91 which turns on transistor 78. The regenerative braking is then controlled by the current provided by the transistor 78.

At the end of regenerative braking the motor speed is so low that the switch 5 remains on continuously as the required commutation cannot occur. When this occurs a transistor 92 is held off continuously by the signal applied to the switch 5 (FIG. 1) which is conveyed to the transistor 92 via terminals 25 and 93 (FIG. 4), terminal 94 (FIG. 5), diode 95 and resistor 96. This enables a capacitor 97 to charge up and after a predetermined period this causes the bistable circuit defined by transistor 55, 67 to change state. The whole circuit then returns to its normal driving condition and the motor will automatically be driven in the opposite direction to that in which it had previously been going.

A transistor 98 (FIG. 4) has its emitter and base terminals connected via terminals 99, 100 across the diode 9 of FIG. 1. The difference between the generated armature voltage during regenerative braking and the battery voltage appears across terminals 99, 100 so that transistor 98 turns off as the generated voltage approaches the battery voltage. When transistor 98 turns off, it turns off transistor 101. Current then passes via resistor 102 and diodes 103, 104 to adjust the brake demand signal at terminal 79. The brake demand current is thus reduced, and the generated armature voltage is then reduced. An unstable condition in the power circuit is thus avoided.

The circuitry at the left hand side of FIG. 4 is adapted to disable the entire system if fault conditions occur. This circuitry is conventional and has therefore not been described in detail.

Referring now to FIGS. 1 and 6, the time at which the forward-reverse switch 17 is reversed is shown as to. At time ts, the field winding 2 has been reversed, and switches 4 and 12 have been opened and closed respectively.

At time ts, a "full conduction" demand signal is applied to the switch 5 which closes and motor current builds up in the path of the armature 1, field 2, switch 5, detector 6 and diode 11. As the generator receives a "full conduction" demand signal the switch 5 stays closed until the motor current reaches a level at which regenerative braking can occur. Thereafter the mark/space ratio of the pulses provided by the gate firing circuit 14 is determined by the position of the foot pedal 18 and the output of current detector 6, and the switch 5 is opened and closed in a cyclical manner.

If regenerative braking was initiated without the switch 5 being fully conductive, the build up of current could follow the path shown in dotted lines in FIG. 6. This would delay the start of regenerative braking and hence increase the energy lost in resistor 13 as the motor current builds up. It would in fact prevent the start of regenerative braking completely if the speed of the motor is relatively low when the switch to regenerative braking is made.

As shown in FIG. 6, as regenerative braking proceeds the motor slows down and the frequency of the mark/space pulses initially increases and then decreases. Eventually the switch 5 is again fully conductive. The circuit 23 detects when the switch 5 has remained conductive for a predetermined period and resets the bistable circuit 16 when this condition is detected. Contacts 4 and 12 then close and open respectively and the normal driving demand signal is passed to the gate firing circuit 14. The motor is then driven in the opposite direction to that in which it had been driven prior to the switch to regenerative braking.

Referring now to FIGS. 7 and 8, the application of the invention to a compound motor will be described.

FIG. 7 shows a compound motor circuit during normal driving, and FIG. 8 shows the same compound motor with its circuit switched for regenerative braking. The means for achieving this switching are not shown for the sake of simplicity.

The compound motor comprises an armature 105, field winding 106 and field winding 107, and is connected across a battery 108. Free-wheeling diodes 109 and 110 are provided in the normal way. During motor driving (FIG. 7) current is initially drawn through armature 105 and field winding 106 by applying pulses to a thyristor switch 111 is an exactly parallel manner to that described above with reference to switch 5 of FIG. 1. When maximum conduction of the thyristor 11 is reached, the motor can be further energised by applying pulses to a second thyristor 112.

During regenerative braking (FIG. 8), braking is initially controlled in a conventional manner by controlling the conductivity of thyristor 112. When thyristor 112 is fully turned on, the thyristor 111 can be controlled to obtain further regenerative braking in exactly the same way as described above with reference to switch 5 of FIGS. 1 and 2. The present invention is thus equally applicable to series and compound motors.

If the battery is fully charged and a demand for regenerative braking is made by depression of foot pedal 18, damage to the battery can result. Conversely, if the battery is flat (say 50% of its nominal voltage) miscommutation of the switch 5 may result so that the switch 5 does not turn off. To prevent these possibilities occurring, a voltage sensitive circuit may be connected across the battery 3 and arranged to provide an output to gate firing circuit 14 whenever predetermined maximum and minimum battery voltage limits are reached during regenerative braking. The output of the voltage sensitive circuit disables the gate firing ciruit 14 so that the switch 5 remains opens regardless of the braking demanded by pedal 18. It will be appreciated that hydraulic and/or pneumatic braking systems may be provided in addition to the regenerative systems described herein.

It will be appreciated that although in the circuit described with reference to FIGS. 1 to 6 driving and regenerative braking is controlled from the same foot pedal, separate drive and brake pedals could be provided. A suitable gating circuit would enable the appropriate pedal to be effective during driving and regenerative braking respectively.

What we claim is:

1. A method for controlling the regenerative braking of a D.C. electric motor having a plugging diode normally forming a short circuit around the armature of the motor, wherein an electronic switch is provided in the motor armature circuit to control regenerative braking current, comprising the steps of: opening the short-circuit, alternately rendering the electronic switch conductive and non-conductive in a class 3 mode of operation, and choosing and maintaining a predetermined interrelationship of the conductive and non-conductive periods of the switch such that the switch alternates between its conductive and non-conductive states, regardless of the ratio between the periods and regardless of the motor speed, at a rate sufficient to automatically maintain the instantaneous motor current within desired maximum and minimum limits, said periods being determined solely by said predetermined relationship without any additional step for setting said desired maximum and minimum limits of instantaneous motor current.

2. A method according to claim 1 further comprising the step of choosing the conductive period $t_1$ and non-conductive period $t_2$ such that $t_1 t_2 / t_1 + t_2$ is a constant.

3. In a pulse controller for controlling the energisation and regenerative braking of a DC electric motor, including an electronic switch for connecting the motor to a power source during motor driving and for controlling motor current during regenerative braking, and means for rendering the electronic switch alternately conductive and non-conductive, the improvement characterized by:

a plugging diode norally forming a short-circuit around the armature of said motor, and means for opening the short-circuit during regenerative braking; and circuit means for controlling the ratio of conductive to non-conductive periods of said switch in a class 3 mode to control the motor current during regenerative braking, so that the conductive and non-conductive periods are interrelated to maintain motor current ripple substantially constant, and so that, regardless of the ratio between the periods and regardless of the speed of the motor, the electronic switch alternates between its conductive and non-conductive states at a rate sufficient to automatically maintain the instantaneous motor current within desired maximum and minimum limits, said switch being in the motor armature circuit, said motor current being maintained within said desired maximum and minimum limits solely by said interrelated periods and without the need for any additional means for setting said maximum and minimum limits.

4. A pulse controller according to claim 1, wherein the conductive and non-conductive periods are interrelated so that t1 t2/t1+t2 is a constant, t1 representing conductive periods and t2 non-conductive periods.

5. A pulse controller according to claim 4, wherein the means for rendering the electronic switch alternately conductive and non-conductive comprises a bistable circuit including a transistor which is turned on and off cyclically to apply pulses to the switch, the transistor being turned on by voltage building up across a capacitor and when turned on being effective to discharge the capacitor, the capacitor being charged by a continuously supplied mark/space ratio control current.

6. A pulse controller according to claim 3, wherein the mark/space ratio control current is supplied by a first current supply circuit during motor driving and by a second current supply circuit during regenerative braking, the two current supply circuits being controlled by a bistable circuit which is effective to disable the first circuit during regenerative braking when it is switched to a first state and the second circuit during motor driving when it is switched to a second state.

7. A pulse controller according to claim 4, comprising a forward/reverse selector switch arranged when actuated to reverse the connection of a motor field to a motor armature, and, when the connection is so reversed, to switch the bistable circuit to its first state.

8. A pulse controller according to claim 6 or 7, comprising a motor current demand signal generating means, a motor current detector, first means for comparing a reference signal with the detected current and for providing at an output thereof the reference signal if the detected current is below a predetermined limit defined by the reference signal and the detected current signal if the detected current is above said limit, and second means for comparing the said output with the motor current demand signal and for providing an effective demand signal to the current supply circuits which is the lesser of the signals compared by the second comparing means.

9. A pulse controller according to claim 6 comprising a starting circuit for providing a motor generation starting current at the beginning of regenerative braking, the starting circuit being turned on by the bistable circuit when the bistable circuit is switched to its first state and being turned off automatically a predetermined time thereafter.

10. A pulse controller according to claim 1, comprising means for comparing the voltage supplied by the source with the generated armature voltage during regenerative braking and means for controlling the regenerative braking current to maintain the generated voltage below the power source voltage.

11. A pulse controller according to claim 10, comprising means for sensing the voltage developed across said plugging diode, the controlling means being effective to control the regenerative braking current so that the sensed voltage is prevented from falling below a predetermined level.

12. A pulse controller according to claim 1, comprising means for sensing battery voltage, and means for preventing regenerative braking if the sensed battery voltage indicates that the battery is fully charged.

13. A pulse controller according to claim 1, comprising means for monitoring the duration of periods in which the electronic switch remains conductive during regenerative braking, and means for automatically switching the controller from its regenerative braking condition to its drive condition when the duration of one of said periods exceeds a predetermined limit.

14. A pulse controller according to claim 13, wherein the monitoring means comprises a capacitive circuit which charges when the electronic switch is on and discharges when the electronic switch is off, the said switching means being activated when the charge of the capacitive circuit reaches a predetermined limit.

15. A pulse controller according to claim 1, comprising means for maintaining the electronic switch in its conductive state for a period subsequent to the switching of the controller to the regenerative braking mode, whereby current generated by the D.C. motor builds up continuously until sufficient to provide regenerative braking.

* * * * *